United States Patent
Hubard, IV et al.

(10) Patent No.: US 10,232,310 B2
(45) Date of Patent: Mar. 19, 2019

(54) MULTI-FUNCTION DUCT FOR DRY SCRUBBER SYSTEM

(71) Applicant: GENERAL ELECTRIC TECHNOLOGY GMBH, Baden (CH)

(72) Inventors: Bennie Randolf Hubard, IV, Dandridge, TN (US); Mark Albert Fiedler, Lenoir City, TN (US)

(73) Assignee: General Electric Technology GmbH, Baden (CH)

( * ) Notice: Subject to any disclaimer, the term of this patent is extended or adjusted under 35 U.S.C. 154(b) by 23 days.

(21) Appl. No.: 15/285,553

(22) Filed: Oct. 5, 2016

(65) Prior Publication Data
US 2018/0093222 A1 Apr. 5, 2018

(51) Int. Cl.
*B01D 53/50* (2006.01)
*B01D 53/34* (2006.01)
*B01D 53/83* (2006.01)

(52) U.S. Cl.
CPC ......... *B01D 53/508* (2013.01); *B01D 53/343* (2013.01); *B01D 53/346* (2013.01); *B01D 53/83* (2013.01); *B01D 2251/20* (2013.01); *B01D 2251/404* (2013.01); *B01D 2251/604* (2013.01); *B01D 2259/126* (2013.01); *B01D 2259/128* (2013.01)

(58) Field of Classification Search
CPC .. B01D 53/508; B01D 53/343; B01D 53/346; B01D 2251/20; B01D 2251/404; B01D 2251/604
See application file for complete search history.

(56) References Cited

U.S. PATENT DOCUMENTS

| 4,610,849 A | 9/1986 | Van Camp et al. |
| 4,645,450 A * | 2/1987 | West .................. F23N 1/022 |
| | | 431/12 |
| 5,887,973 A | 3/1999 | Åhman et al. |
| 7,850,936 B2 | 12/2010 | Levasseur et al. |
| 8,518,353 B1 | 8/2013 | Neathery et al. |
| 8,715,600 B1 | 5/2014 | Gayheart |
| 9,108,152 B2 | 8/2015 | Landmer |

(Continued)

FOREIGN PATENT DOCUMENTS

| CN | 201244443 Y | 5/2009 |
| CN | 203507814 U | 4/2014 |
| WO | 97/37747 A1 | 10/1997 |

OTHER PUBLICATIONS

Machine Translation of CN203507814 to Zhejiang Tuna Environmental Science & Technology Co. Ltd.*

(Continued)

*Primary Examiner* — Daniel McCracken
(74) *Attorney, Agent, or Firm* — GE Global Patent Operation; Rita D. Vacca

(57) ABSTRACT

A multi-function duct for a dry scrubber system useful for processing a gas stream, such as a flue gas stream produced by a fossil fuel fired boiler, a combustion process or the like, is provided. The multi-function duct is useful for a circulating dry scrubber (CDS) dry flue gas desulfurization (DFGD) system operable for dry or moistened reducing agent distribution into a flue gas stream flowing therethrough. As such, the distributed dry or moistened reducing agent reacts with acid gas in the flue gas to produce a dry reaction product.

15 Claims, 6 Drawing Sheets

(56) References Cited

U.S. PATENT DOCUMENTS

| | | |
|---|---|---|
| 2005/0244317 A1 | 11/2005 | Ahman et al. |
| 2008/0159922 A1 | 7/2008 | Sauer et al. |
| 2013/0095018 A1 | 4/2013 | Pilats |
| 2013/0294992 A1 | 11/2013 | Fiedler |
| 2014/0086797 A1 | 3/2014 | Petty |

OTHER PUBLICATIONS

International Search Report and Written Opinion issued in connection with corresponding PCT Application No. PCT/EP2017/074840, dated Jan. 2, 2018.

Hubard, B. R., et al., Multi-Function Duct for Dry Scrubber System, GE Co-Pending U.S. Appl. No. 15/258,617, filed Oct. 5, 2016.

\* cited by examiner

MULTI-FUNCTION DUCT FOR DRY SCRUBBER SYSTEM

FIELD OF THE DISCLOSURE

The present disclosure is generally directed to a multi-function duct for a dry scrubber system useful for processing a gas stream, such as a flue gas stream produced by a fossil fuel fired boiler, a combustion process or the like. More specifically, the present disclosure is directed to a multi-function duct for a circulating dry scrubber (CDS) dry flue gas desulfurization (DFGD) system operable for dry or moistened reducing agent distribution into a flue gas stream flowing therethrough.

BACKGROUND OF THE DISCLOSURE

In the treatment of flue gas, dry flue gas desulfurization (DFGD) systems are known. In DFGD systems, lime (CaO) is first converted to hydrated lime ($Ca(OH)_2$) before being placed in contact with the flue gas to be treated. The hydrated lime is placed in contact with the flue gas as a dry or moistened powder within a circulating dry scrubber (CDS) DFGD system. An example of such a CDS DFGD system is the General Electric NID™ system (General Electric Company, Fairfield, Conn., USA).

WO 97/37747, invented by Stefan Ahman et al., discloses a device for a CDS DFGD system useful for discharging and distributing such a dry or moistened powder absorbent material in a flue gas duct. Accordingly, in a vertical flue gas duct, a discharging and distributing device is arranged to discharge and distribute a dry or moistened powder absorbent material reactive with the gaseous pollutants in the flue gas to produce a separable dust reaction product. Hence, through reaction with the dry or moistened powder absorbent material, gaseous pollutants in the flue gas are removed by conversion to the separable dust reaction product.

While methods and equipment capable of removing both particulate and gaseous pollutants from a flue gas stream exist, there remains a need for improved DFGD methods and equipment that are lower cost, while maintaining system stability, efficiency and effectiveness.

SUMMARY

The present disclosure provides an air quality control system (AQCS) comprising a General Electric NID™ system (NID) dry flue gas desulfurization (DFGD) system or like system operable using a dry or moistened powder reducing agent, such as calcium oxide or calcium hydroxide. The subject AQCS system uses a NID DFGD system or NID-like system equipped with a multi-function duct, used in combination with a fabric filter (FF) to treat flue gas for the removal of sulfur dioxide, and like particulate and gaseous pollutants therefrom. The use of dry or moistened powder calcium oxide or calcium hydroxide is desirable due to lower capital investment requirements and lower associated operating costs as compared to wet flue gas desulfurization (WFGD) systems or spray dryer absorber (SDA) DFGD systems that operate using an aqueous lime slurry. While the present disclosure is directed to DFGD using a NID system or NID-like system in combination with a FF, the teachings of the present disclosure are equally applicable to other types of particulate collection systems, such as using an electrostatic precipitator (ESP) for particulate removal. Further, for purposes of clarity and simplicity, the present disclosure describes only certain exemplified embodiments of the subject DFGD NID system equipped with a multi-function duct, useful in the distribution of reducing agent in a flue gas during plant operation for flue gas desulfurization, with system stability, efficiency and effectiveness, at a relatively lower cost. However, additional embodiments are contemplated and will become apparent from the subject description of the exemplified embodiments illustrated, and the exemplified methods associated therewith.

The AQCS of the present disclosure comprises a multi-function duct. This multi-function duct comprises a horizontal inlet section, a bend section, an offset section, a hopper section, and a vertical duct section. The horizontal inlet section comprises an open inlet fluidly connected to an interior area defined by two opposed side walls arranged between an opposed top wall and bottom wall. This horizontal inlet section provides relatively unrestricted flue gas flow therethrough. Within the horizontal inlet section is a pressure sensor for measuring the pressure of the flue gas flowing through the horizontal inlet section.

Fluidly connected to the horizontal inlet section, is a bend section of relatively restricted flue gas flow. The bend section comprises an extension wall and joined thereto a deflect wall arranged at a 45 degree angel with respect to the bottom wall of the horizontal inlet section. Between the extension wall and the deflect wall is a closable opening for removal of any solid material collected between the walls. The deflect wall joins a vertical wall arranged at a 90 degree angle with respect to the bottom wall of the horizontal inlet section. Opposed to the deflect wall and the vertical wall is a bend wall. Opposed side walls are arranged between the joined deflect wall and vertical wall, and the bend wall. The cross sectional area of an outlet of the bend section is about 50 percent to about 75 percent smaller than the cross sectional area of the horizontal inlet section. Due to the smaller cross sectional area of the bend section, flue gas flow is restricted thereby causing a flue gas pressure increase and flow velocity increase therein, and a pressure drop downstream thereof. Within the bend section is a pressure sensor for measuring the pressure of the flue gas flowing through the bend section. As such, a flue gas pressure measurement is measured in the unrestricted horizontal inlet section and a flue gas pressure measurement is measured in the restricted bend section. Each of the flue gas pressure measurements are electronically received by a control device. The control device calculates or determines from the pressure measurements received the multi-function duct pressure differential. This multi-function duct pressure differential is used to prove and measure flue gas flow. Based on the flue gas flow as calculated or determined from the multi-function duct pressure differential, the control device electronically controls a supply of a required amount of a dry or moistened powder reducing agent to the multi-function duct to achieve effective flue gas desulfurization.

Fluidly connected to the bend section is an offset section. The offset section includes an interior area defined by an inward wall joined to the vertical wall of the bend section, an opposed outward wall joined to the bend wall of the bend section, and opposed side walls arranged between the inward wall and outward wall. The inward wall is offset from the vertical wall by an angle of about 5 to about 25 degrees, or about 15 degrees. The outward wall extends outwardly at an angle of about 30 to about 60 degrees, or about 45 degrees from a vertical end portion of the bend wall. This junction point of the outward wall and the vertical end portion of the bend wall is a relatively sharp and abrupt angle to prevent a recirculation of the flow of flue gas back to the offset section. As such, the relatively sharp point and abrupt angle of this junction point promotes continued upward flue gas flow. Further, this configuration of the offset section works in conjunction with a hopper section described below, to provide improved dry or moistened powder reducing agent flow and efficiency.

Fluidly connected to the offset section is the hopper section. The hopper section includes an interior area defined by a first vertical wall joined to the inward wall of the offset section, and a second vertical wall joined to the outward wall of the offset section. Joined to the second vertical wall of the hopper section is an outward wall arranged at an angle of about 30 to about 60 degrees, or about 45 degrees with respect to the second vertical wall. Joined to the outward wall is a horizontal wall. Joined to the horizontal wall is a third vertical wall arranged parallel with respect to the opposed first vertical wall. Two opposed side walls are arranged between the first vertical wall, and the opposed second vertical wall, outward wall, horizontal wall and third vertical wall. Within the third vertical wall of the hopper section is an inlet opening. The inlet opening is fluidly connected to the interior area of the hopper section. Through the inlet opening, dry or moistened powder reducing agent is introduced into the hopper section of the multi-function duct for intermixing and contact with flue gas flowing therethrough. A portion of introduced dry or moistened powder reducing agent may impact the first vertical wall and slide or flow downwardly along the first vertical wall. Dry or moistened powder reducing agent sliding or flowing downwardly along the first vertical wall is "picked up" or entrained within the upward flow of flue gas diverted inwardly by the inward wall of the offset section. As such, the offset section works in conjunction with the hopper section to provide improved dry or moistened powder reducing agent flow and efficiency.

Fluidly connected to the hopper section is a vertical duct section. The vertical duct section comprises four vertical walls joined to the four vertical walls of the hopper section. However, as an option, the vertical wall of the vertical duct section directly above the third vertical wall may be arranged a relatively small distance inward of and parallel to the third vertical wall in order to create a horizontal lip therebetween. Within the vertical duct section, intermixing contact of the introduced dry or moistened powder reducing agent with the flue gas continues prior to flow into a particulate collector via a fluidly connected duct arranged therebetween.

Benefits of the subject multi-function duct include elimination of venturi flow of flue gas through the subject multi-function duct. With the elimination of venturi flow of the flue gas, the subject multi-function duct enables significantly improved plant pressure management. A relatively low pressure measurement is measured by a pressure sensor arranged in the horizontal inlet section of the multi-function duct. Likewise, a relatively high pressure measurement is measured by a pressure sensor arranged in the bend section of the multi-function duct. The combination of the relatively low pressure measurement and the relatively high pressure measurement increases the magnitude of the differential pressure signal received by the control device, providing for or enabling improved plant pressure management. Further, the hopper section of the subject multi-function duct may be enlarged according to plant requirements adding significant beneficial design flexibility. Still further, construction of the subject multi-function duct is simplified over that of the venturi flow "J" duct disclosed in WO 97/37747, and allows for significant material savings thereover.

A method of using the subject multi-function duct comprises fluidly connecting the multi-function duct to a source of flue gas, supplying a flow of the flue gas from the source to the multi-function duct, and supplying a dry or moistened powder reducing agent to the flow of flue gas within the multi-function duct. The multi-function duct of the subject method comprises a horizontal inlet section, a bend section, an offset section, a hopper section, and a vertical duct section. The horizontal inlet section comprises an open inlet fluidly connected to an interior area defined by two opposed side walls arranged between an opposed top wall and bottom wall. This horizontal inlet section provides relatively unrestricted flue gas flow therethrough. Within the horizontal inlet section is a pressure sensor. As such, the subject method further comprises measuring a pressure of the flue gas flowing through the horizontal inlet section.

Fluidly connected to the horizontal inlet section, is a bend section of relatively restricted flue gas flow. The bend section comprises an extension wall and joined thereto a deflect wall arranged at an angle of about 30 to about 60 degrees, or about 45 degrees with respect to the bottom wall of the horizontal inlet section. Between the extension wall and the deflect wall is a closable opening for solid material removal of any solid material collected between the extension wall and the deflect wall. The deflect wall joins a vertical wall arranged at an angle of about 70 to about 110 degrees, or about 90 degrees with respect to the bottom wall of the horizontal inlet section. Opposed to the deflect wall and the vertical wall is a bend wall. Opposed side walls are arranged between the joined deflect wall and vertical wall, and the bend wall. The cross sectional area of an outlet of the bend section is about 50 percent to about 75 percent smaller than the cross sectional area of the horizontal inlet section. Due to the smaller cross sectional area of the bend section, flue gas flow is restricted thereby causing a flue gas pressure increase and flow velocity increase therein, and a pressure drop downstream thereof. Within the bend section is a pressure sensor. The subject method further comprises measuring a pressure of the flue gas flowing through the bend section. As such, a flue gas pressure measurement is measured in the relatively unrestricted horizontal inlet section and a flue gas pressure measurement is measured in the relatively restricted bend section. Each of the flue gas pressure measurements are electronically received by a control device. The subject method further comprises using a control device to calculate or determine from the pressure measurements received by the control device, the multi-function duct pressure differential. The subject method further comprises using the pressure differential to calculate or determine flue gas flow. Further, using the flue gas flow as calculated or determined from the multi-function duct pressure differential, the control device electronically controls a supply of an amount of a dry or moistened powder reducing agent to the multi-function duct to achieve effective flue gas desulfurization.

Fluidly connected to the bend section is an offset section. The offset section includes an interior area defined by an inward wall joined to the vertical wall of the bend section, an opposed outward wall joined to the bend wall of the bend section, and opposed side walls arranged between the inward wall and outward wall. The inward wall is offset from the vertical wall by an angle of about 5 to about 25 degrees, or about 15 degrees. The outward wall extends outwardly at an angle of about 30 to about 60 degrees, or about 45 degrees from a vertical end portion of the bend wall. This junction point of the outward wall and the vertical end portion of the bend wall is a relatively sharp and abrupt angle to prevent a recirculation of the flow of flue gas back to the offset section. As such, the relatively sharp point and abrupt angle of this junction point promotes continued upward flue gas flow. Further, this configuration of the offset section works in conjunction with the fluidly connected hopper section to provide improved dry or moistened powder reducing agent flow and efficiency.

The fluidly connected hopper section includes an interior area defined by a first vertical wall joined to the inward wall of the offset section, and a second vertical wall joined to the outward wall of the offset section. Joined to the second vertical wall of the hopper section is an outward wall arranged at an angle of about 30 to about 60 degrees, or about 45 degrees with respect to the second vertical wall. Joined to the outward wall is a horizontal wall. Joined to the horizontal wall is a third vertical wall arranged parallel with respect to the opposed first vertical wall. Two opposed side walls are arranged between the first vertical wall, and the opposed second vertical wall, outward wall, horizontal wall and third vertical wall. Within the third vertical wall of the hopper section is an inlet opening. The inlet opening is fluidly connected to the interior area of the hopper section. Through the inlet opening, dry or moistened powder reducing agent is introduced into the hopper section of the multi-function duct for intermixing and contact with flue gas flowing therethrough for desulfurization thereof. A portion of introduced dry or moistened powder reducing agent may impact the first vertical wall and slide or flow downwardly along the first vertical wall. Dry or moistened powder reducing agent sliding or flowing downwardly along the first vertical wall is "picked up" or entrained within the upward flow of flue gas diverted inwardly by the inward wall of the offset section. As such, the offset section works in conjunction with the hopper section to provide improved dry or moistened powder reducing agent flow and efficiency.

Fluidly connected to the hopper section is a vertical duct section. The vertical duct section comprises four vertical walls joined to the four vertical walls of the hopper section. However, as an option, the vertical wall of the vertical duct section directly above the third vertical wall may be arranged a relatively small distance inward of and parallel to the third vertical wall in order to create a horizontal lip therebetween. Within the vertical duct section, intermixing contact of the introduced dry or moistened powder reducing agent with the flue gas continues prior to flow into a particulate collector via a fluidly connected duct arranged therebetween.

Benefits of the subject method of using the subject multi-function duct include elimination of venturi flow of flue gas through the subject multi-function duct. With the elimination of venturi flow of the flue gas, the subject multi-function duct provides or enables significant plant pressure management. A relatively low pressure measurement is measured by a pressure sensor arranged in the horizontal inlet section of the multi-function duct. Likewise, a relatively high pressure measurement is measured by a pressure sensor arranged in the bend section of the multi-function duct. The combination of the relatively low pressure measurement and the relatively high pressure measurement increases the magnitude of the differential pressure signal received by the control device, providing for or enabling improved plant pressure management. Further, according to the subject method, the hopper section of the subject multi-function duct may be enlarged according to plant requirements adding significant beneficial design flexibility. Still further, according to the subject method, construction of the subject multi-function duct is simplified over that of the venturi flow "J" duct disclosed in WO 97/37747, and allows for significant material savings thereover.

In summary, the subject multi-function duct useful for flue gas desulfurization comprises a horizontal inlet section equipped with a first pressure sensor, a bend section equipped with a second pressure sensor, an offset section, a hopper section equipped with a distribution device, and a vertical duct section. In the subject multi-function duct, the first pressure sensor and the second pressure sensor are each operative to electronically transmit pressure measurements to a control device. Further, the distribution device associated with the multi-function duct is operative to distribute a dry or moistened reducing agent within the hopper section upon flue gas flow through the hopper section. Still further, in the subject multi-function duct, an outlet of the bend section is 50 to 75 percent smaller in cross section than that of an outlet of the horizontal inlet section. The subject disclosure likewise provides for a plant comprising a source of flue gas, a desulfurization system for treatment of the flue gas comprising a multi-function duct comprising a horizontal inlet section equipped with a first pressure sensor, a bend section equipped with a second pressure sensor, an offset section, a hopper section equipped with a distribution device, and a vertical duct section, and a particulate collector. In the subject plant, the first pressure sensor and the second pressure sensor are each operative to electronically transmit pressure measurements to a control device. Further, in the subject plant, the distribution device is operative to distribute a dry or moistened powder reducing agent within the hopper section upon flue gas flow through the hopper section for reaction between the dry or moistened powder reducing agent and acid gas within the flue gas for flue gas desulfurization with production of a separable reaction product. Still further, within the subject plant, an outlet of the bend section is 50 to 75 percent smaller in cross section than that of an outlet of the horizontal inlet section.

In summary, a method of using a multi-function duct useful for flue gas desulfurization comprises fluidly connecting a source of flue gas to a multi-function duct comprising a horizontal inlet section equipped with a first pressure sensor, a bend section equipped with a second pressure sensor, an offset section, a hopper section equipped with a distribution device, and a vertical duct section, and distributing a dry or moistened powder reducing agent into flue gas flowing through the hopper section via the distribution device for contact reaction between the dry or moistened powder reducing agent and acid gas within the flue gas to produce a separable reaction product. According to this method the first pressure sensor and the second pressure sensor are each operative to electronically transmit pressure measurements to a control device. Also according to this method, the first pressure sensor and the second pressure sensor are each operative to electronically transmit pressure measurements to a control device operative for control of dry or moistened powder reducing agent supply to the hopper section based on received pressure measurements. Also in accordance with this method an outlet of the bend section is 50 to 75 percent smaller in cross section than that of an outlet of the horizontal inlet section. The subject disclosure also provides for a method of operating a plant comprising fluidly connecting a source of flue gas to a multi-function duct comprising a horizontal inlet section equipped with a first pressure sensor, a bend section equipped with a second pressure sensor, an offset section, a hopper section equipped with a distribution device, and a vertical duct section, distributing a dry or moistened powder reducing agent into flue gas flowing through the hopper section via the distribution device for contact reaction between the dry or moistened powder reducing agent and acid gas within the flue gas for flue gas desulfurization and production of a separable reaction product, and separating the separable reaction product from the flue gas in a particulate collector to produce cleaned flue gas. In accordance with this method, the first pressure sensor and the second pressure sensor are each operative to electronically transmit pressure measurements to a control device. Also according to this method, an outlet of the bend section is 50 to 75 percent smaller in cross section than that of an outlet of the horizontal inlet section.

BRIEF DESCRIPTION OF THE DRAWINGS

The subject disclosure will now be described in more detail with reference to the appended drawings in which.

Other details, objects, and advantages of the embodiments disclosed herein will become apparent from the following description of the exemplified embodiments illustrated, and exemplified methods associated therewith.

DETAILED DESCRIPTION

Figure 1:
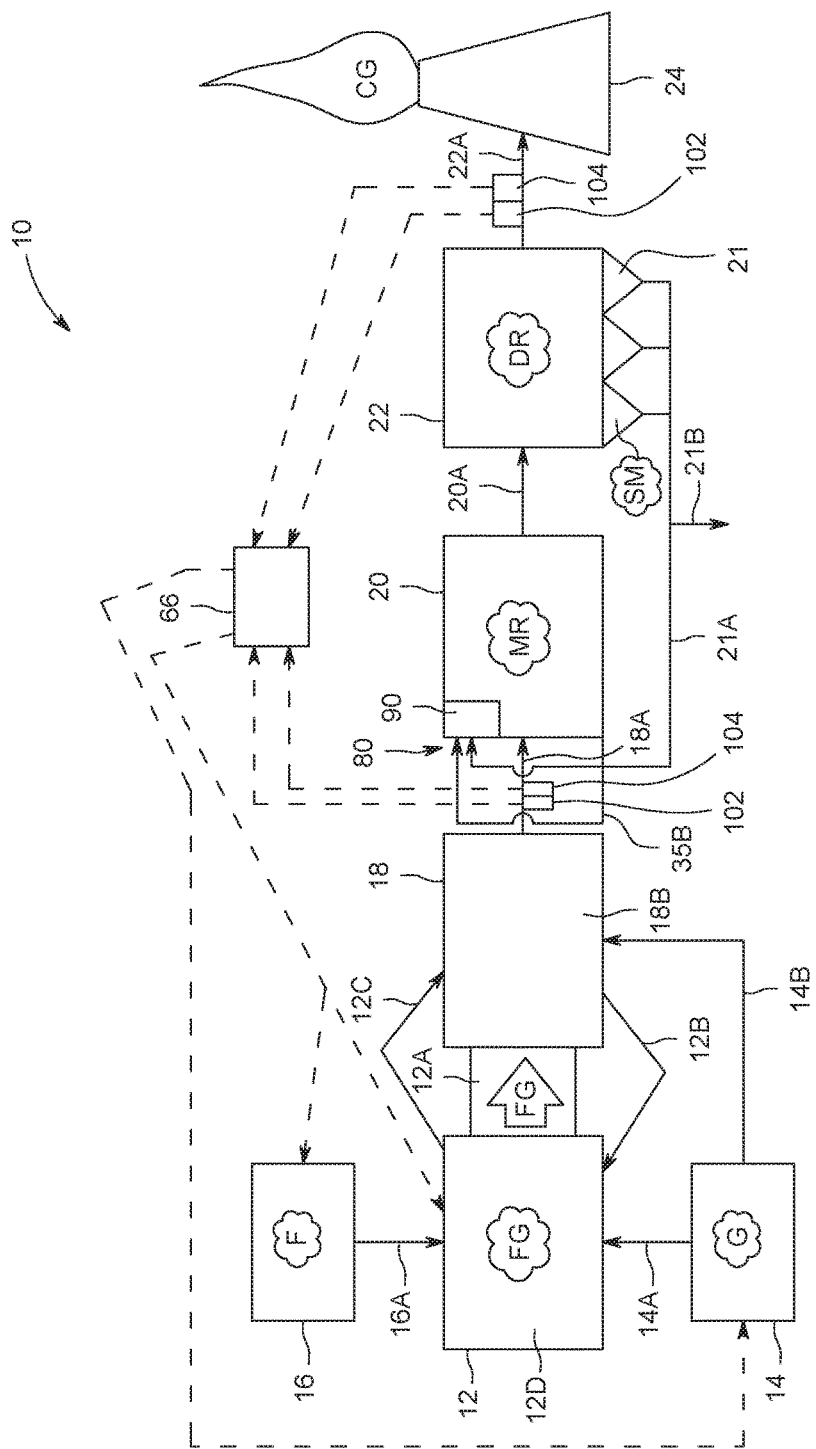
FIG. 1 is a schematic side cross-section view of a power plant with a dry flue gas desulfurization system in accordance with the subject disclosure.

Referring to FIG. 1, disclosed herein is a plant 10 such as a power plant or an industrial plant including a combustion unit 12, such as for example a steam producing boiler unit. The combustion unit 12 may be supplied at least one oxygen containing gas G, e.g., air, $O_2$ gas, or gases that include $O_2$ gas, from a gas supply 14 via a fluidly connected supply pipe 14A. Likewise, the combustion unit 12 is supplied a carbonaceous fuel F from a fuel supply 16 via a fluidly connected fuel duct 16A for combustion of the fuel F within the combustion unit 12. The fuel F supplied to combustion unit 12 is preferably a fossil fuel such as for example coal, oil, or natural gas. In addition to steam, flue gas FG is produced upon fuel F combustion within the combustion unit 12. Steam produced by fuel F combustion can be transported to a turbine (not shown) for use in generating electricity, or put to other uses such as for example district heating, combustion unit 12 pre-heating, or the like. Flue gas FG produced by fuel F combustion comprises acid gases, such as for example but not limited to sulfur oxides ($SO_x$), and hydrogen chloride (HCl), ash, heavy metals and particulates. Flue gas FG produced in the combustion unit 12 flows out of an interior area 12D of the combustion unit 12 through a fluidly connected conduit 12A, into an interior area 18B of a fluidly connected optional air pre-heater 18. Air pre-heater 18 is operable to transfer heat energy from the hot flue gas FG flowing therethrough to a heat transfer fluid HT also flowing therethrough. The heat transfer fluid HT may be steam, steam condensate, pressurized hot water, such a fluid from a waste heat source, or the like. The flow of the heat transfer fluid HT though the air pre-heater 18 is in a direction opposite that of the flow of hot flue gas FG through the air pre-heater 18. Heated heat transfer fluid HT is used within plant 10, such as for pre-heating needs associated with the operation of combustion unit 12. The heat transfer fluid HT is circulated within plant 10, with the heated heat transfer fluid HT flowing out of air pre-heater 18 via fluidly connected duct 12B into combustion unit 12 and the cooled heat transfer fluid HT flowing out of combustion unit 12 via fluidly connected duct 12C into air pre-heater 18. As an optional addition or alternative to using a heat transfer fluid HT in air pre-heater 18, the at least one oxygen containing gas G may be used in air pre-heater 18. As such, air pre-heater 18 is operable to transfer heat energy from the hot flue gas FG flowing therethrough to the at least one oxygen containing gas G, e.g., air, $O_2$ gas, or gases that include $O_2$ gas, from gas supply 14 circulated to air pre-heater 18 via a fluidly connected supply pipe 14B for flow therethrough. Flow of the at least one oxygen containing gas G through the air pre-heater 18 is in a direction opposite that of the flow of hot flue gas FG through air pre-heater 18. Heated at least one oxygen containing gas G is used within combustion unit 12 for added combustion unit 12 efficiency. For such purpose, the at least one oxygen containing gas G once heated within the air pre-heater 18, flows out of air preheater 18 via fluidly connected duct 12B into combustion unit 12. The at least one oxygen containing gas G then flows out of combustion unit 12 via fluidly connected conduit 12A into air pre-heater 18 as hot flue gas FG.

Figure 2:
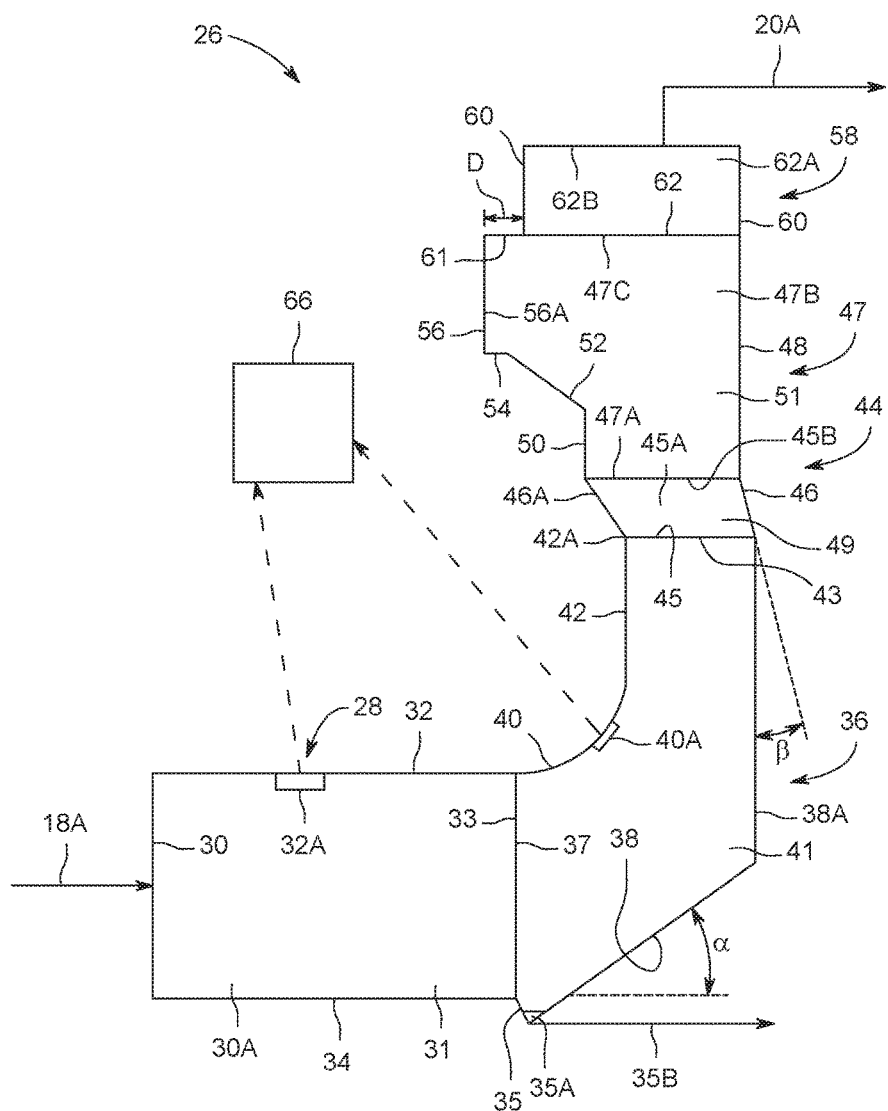
FIG. 2 is an enlarged schematic side cross-section view of the subject multi-function duct used in the dry flue gas desulfurization system of FIG. 1.

From interior area 18B of air pre-heater 18, a reduced temperature flue gas FG flows via fluidly connected duct 18A into the subject exemplified embodiment of a DFGD NID system 20 equipped with the subject multi-function duct 26, as illustrated in FIG. 2. This multi-function duct 26 comprises a horizontal inlet section 28, a bend section 36, an offset section 44, a hopper section 47, and a vertical duct section 58. The various sections of the multi-function duct 26 may be fabricated from one or more metal sheets using welding, rivets or a combination thereof. The horizontal inlet section 28 comprises an inlet opening 30 fluidly connected to an interior area 30A defined by two opposed side walls 31 arranged between an opposed top wall 32 and bottom wall 34. Opposite inlet opening 30 is outlet opening 33. This horizontal inlet section 28 provides relatively unrestricted flue gas FG flow therethrough. Within the horizontal inlet section 28 is a pressure sensor 32A for measuring the pressure of the flue gas FG flowing through the horizontal inlet section 28.

Fluidly connected to the horizontal inlet section 28, is a bend section 36 of relatively restricted flue gas FG flow. The bend section 36 comprises an inlet opening 37 fluidly connected to an interior area 37A. Interior area 37A is defined by an extension wall 35, a deflect wall 38, a vertical wall 38A, a bend wall 40, and two opposed side walls 41. The deflect wall 38, joined to the extension wall 35, is arranged at an angle α of about 30 to about 60 degrees, or about 45 degrees with respect to the bottom wall 34 of the horizontal inlet section 28. Arranged between the extension wall 35 and the deflect wall 38 is a closable opening 35A for removal of any solid material collected between the walls 35, 38. The deflect wall 38 joins the vertical wall 38A arranged at an angle of about 70 to about 110 degrees, or about 90 degrees with respect to the bottom wall 34 of the horizontal inlet section 28. Opposed to the deflect wall 38 and the vertical wall 38A is the bend wall 40. Bend wall 40 is curved having a radius of curvature of about 60 to about 120 degrees, or about 90 degrees. Opposed side walls 41 are arranged between the joined deflect wall 38 and vertical wall 38A, and the bend wall 40. The cross sectional area of an outlet opening 43 of the bend section 36 is about 50 percent to about 75 percent smaller than that of the outlet opening 33 of the horizontal inlet section 28. Due to the smaller cross sectional area of the outlet opening 43 of the bend section 36, flue gas FG flow is restricted causing a flue gas pressure increase and flue gas flow velocity increase therein, and a pressure drop downstream thereof. Within the bend section 36 is a pressure sensor 40A for measuring the pressure of the flue gas FG flowing through the bend section 36. As such, a flue gas FG pressure measurement is measured in the relatively unrestricted horizontal inlet section 28 and a flue gas FG pressure measurement is measured in the relatively restricted bend section 36. Each of the flue gas pressure measurements are electronically transmitted to and received by a control device 66. The control device 66 calculates or determines from the pressure measurements received the multi-function duct 26 pressure differential. This multi-function duct 26 pressure differential is used to measure flue gas FG flow. Based on the flue gas FG flow as calculated or determined from the multi-function duct 26 pressure differential, the control device 66 electronically controls a supply of an amount of a dry or moistened powder reducing agent MR to the multi-function duct 26 for effective flue gas FG desulfurization.

Fluidly connected to the bend section 36 is an offset section 44. Offset section 44 includes an inlet opening 45 fluidly connected to an interior area 45A defined by an inward wall 46 joined to the vertical wall 38A of the bend section 36, an opposed outward wall 46A joined to the bend wall 40 and opposed side walls 49 arranged between the inward wall 46 and outward wall 46A. The inward wall 46 is offset from vertical wall 38A by an angle β of about 5 to about 30 degrees, or about 15 degrees. The outward wall 46A extends outwardly at an angle of about 30 to about 60 degrees, or about 45 degrees from a vertical end portion 42 of the bend wall 40. This junction point 42A of the outward wall 46A and the vertical end portion 42 of the bend wall 40 is a relatively sharp and abrupt angle to prevent a recirculation of the flow of flue gas FG back to the offset section 44. As such, the relatively sharp and abrupt angle of this junction point 42A promotes continued upward flue gas FG flow. Further, this configuration of the offset section 44 works in conjunction with the below described hopper section 47 to provide improved dry or moistened powder reducing agent flow and efficiency. Opposite inlet opening 45 of offset section 44 is outlet opening 45B.

Figure 3:
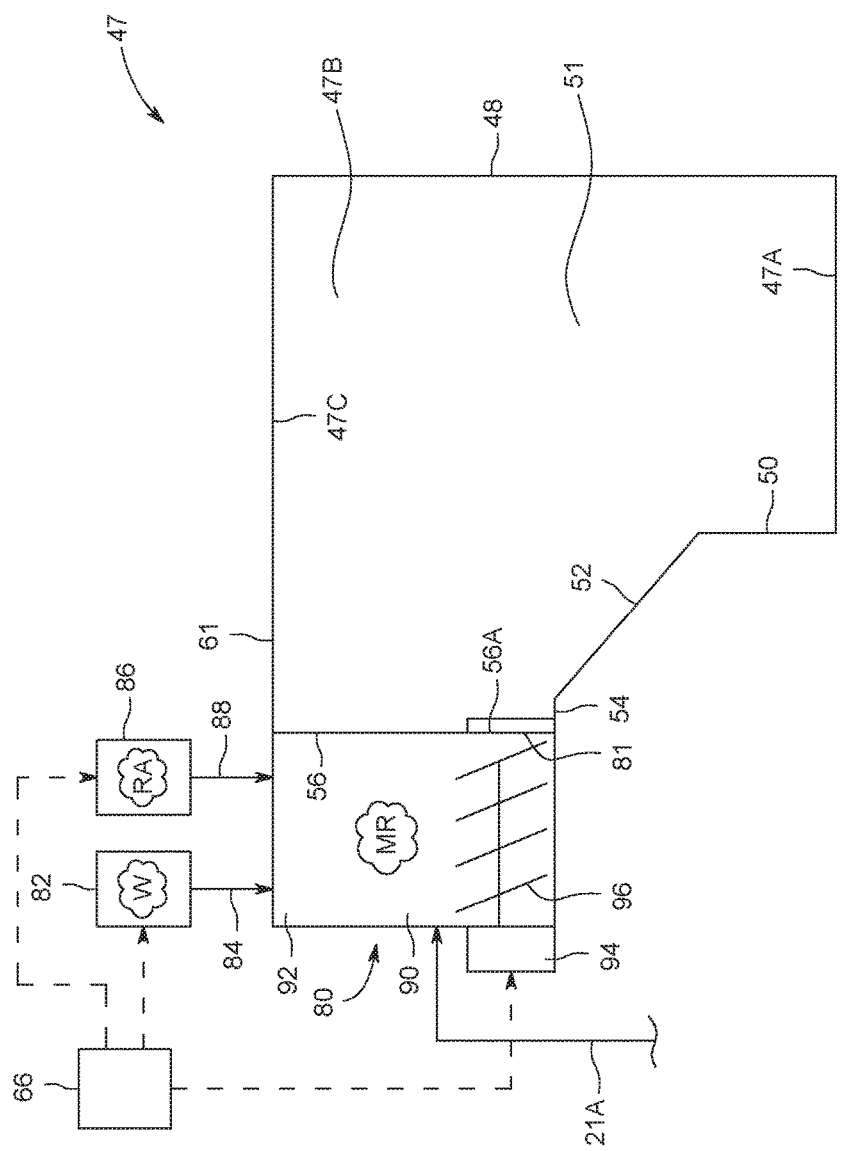
FIG. 3 is an enlarged schematic side cross-section view of the hopper section of FIG. 2 equipped with a distribution device.

Fluidly connected to offset section 44 is a hopper section 47. Hopper section 47 includes an inlet opening 47A fluidly connected to an interior area 47B defined by a first vertical wall 48 joined to the inward wall 46 of the offset section 44, a second vertical wall 50 joined to the outward wall 46A of the offset section 44. Joined to the second vertical wall 50 of the hopper section 47 is an outward wall 52 arranged at an angle of about 30 to about 60 degrees, or about 45 degrees with respect to the second vertical wall 50. Joined to the outward wall 52 is a horizontal wall 54. Joined to the horizontal wall 54 is a third vertical wall 56 arranged parallel with respect to the opposed first vertical wall 48. Two opposed side walls 51 are arranged between the first vertical wall 48, and the opposed second vertical wall 50, outward wall 52, horizontal wall 54 and third vertical wall 56. Within the third vertical wall 56 of the hopper section 47 is an open inlet 56A. Through the open inlet 56A, dry or moistened powder reducing agent MR is introduced into the hopper section 47 of the multi-function duct 26 for intermixing contact with flue gas FG flowing therethrough, out outlet opening 47C. A portion of introduced dry or moistened powder reducing agent MR may impact the first vertical wall 48 and slide or flow downwardly along the first vertical wall 48. Dry or moistened powder reducing agent MR sliding or flowing downwardly along the first vertical wall 48 is "picked up" or entrained within the upward flow of flue gas FG diverted inwardly by the inward wall 46 of the offset section 44. As such, the offset section 44 works in conjunction with the hopper section 47 to provide improved dry or moistened powder reducing agent MR flow and efficiency. In fluid communication with open inlet 56A of hopper section 47 is an outlet 81 of a distribution device 80, as illustrated in FIG. 3. An exemplified distribution device 80 is disclosed in U.S. Pat. No. 5,887,973, incorporated herein in its entirety by reference. As such, distribution device 80 arranged vertically above horizontal inlet section 28 for a reduced overall system footprint, distributes a dry or moistened powder reducing agent MR, such as hydrated lime ($Ca(OH)_2$) into flue gas FG flowing through the subject multi-function duct 26. For this purpose, water W from a water supply 82 flows through a fluidly connected pipe 84 to fluidly connected distribution device 80. Further, reducing agent RA from a reducing agent supply 86 is supplied through a fluidly connected duct 88 to fluidly connected distribution device 80. Distribution device 80 comprises a container 90 essentially in the shape of an elongated box defining an open interior area 92. Container 90 comprises a motor 94 and a mixer 96 for mixing together water W from water supply 82, optionally a portion of separated solid materials SM collected in hoppers 21 via ducts 21A, optionally a portion of solid material removed from closable opening 35A via duct 35B, and reducing agent RA from the reducing agent supply 86, to produce dry or moistened powder reducing agent MR having a water content of approximately 1 percent to approximately 6 percent, or approximately 3 percent. Operation speed of the motor 94 and mixer 96 are electronically controlled by control device 66. Dry or moistened powder reducing agent MR is uniformly distributed by the distribution device 80 through the fluidly connected open inlet 56A of hopper section 47 of the subject multi-function duct 26. As such, dry or moistened powder reducing agent MR may be continuously introduced into hopper section 47 for uniform distribution and intermixing contact with the flue gas FG flowing therethrough.

Fluidly connected to hopper section 47 is a vertical duct section 58. Vertical duct section 58 comprises an inlet opening 62 fluidly connected to an interior area 62A defined by four vertical walls 60 joined to the four vertical walls 48, 51, 56 of the hopper section 47. However, as an option, the vertical wall 60 of the vertical duct section 58 directly above the third vertical wall 56 may be arranged a relatively small distance D inward of and parallel to the third vertical wall 56 in order to create a horizontal lip 61 therebetween. Within the vertical duct section 58, intermixing contact of the introduced dry or moistened powder reducing agent MR with the flue gas FG continues. The dry or moistened powder reducing agent MR reacts with acid gas in the flue gas FG thereby reducing or removing acid gas from the flue gas FG and producing a cleaned flue gas CG. The reaction between the acid gas in the flue gas FG and the dry or moistened powder reducing agent MR, produces a dry reaction product DR entrained by the flue gas FG. The entrained dry reaction product DR flows with the flue gas FG from vertical duct section 58 via outlet 62B through a fluidly connected duct 20A, and into a particulate collector 22, such as a fabric filter, an electrostatic precipitator or the like. Solid particulates carried in the flue gas FG including the entrained dry reaction product DR is separated from the flow of flue gas FG and collected in hoppers 21 of particulate collector 22 as separated solid materials SM. The separated solid materials SM collected in hoppers 21 are optionally transported through fluidly connected ducts 21A to fluidly connected container 90 for mixture with water W from water supply 82, and reducing agent RA from the reducing agent supply 86, to produce the dry or moistened powder reducing agent MR. Alternatively, a portion of the separated solid materials SM collected in hoppers 21 may be transported elsewhere for other purposes or discarded in an environmentally conservative manner via duct 21B, which is likewise true for solid material removed from closable opening 35A via duct 35B. Cleaned flue gas CG exits particulate collector 22 via fluidly connected duct 22A for release to the atmosphere via fluidly connected stack 24.

For control of the subject DFGD NID system 20, sulfur dioxide $SO_2$ sensors 102, temperature sensors 104 and pressure sensors 32A, 40A, measure sulfur dioxide levels, measure temperatures, and measure pressures, respectively, electronically transmitting the measured sulfur dioxide levels, temperatures and pressures to the control device 66. For such purpose, sulfur dioxide $SO_2$ sensors 102 are preferably arranged upstream of the DFGD NID system 20 in duct 18A and downstream of particulate collector 22 in duct 22A, although other arrangements are likewise possible. Temperature sensors 104 are also preferably arranged upstream of the DFGD NID system 20 in duct 18A and downstream of particulate collector 22 in duct 22A, although other arrangements are likewise possible. Pressure sensors 32A and 40A are arranged in multi-function duct 26 as described above. Measurements by the sulfur dioxide $SO_2$ sensors 102, temperature sensors 104 and pressure sensors 32A and 40A are electronically transmitted to control device 66 for control of DFGD NID system 20. For example, if the sulfur dioxide $SO_2$ measurements transmitted to the control device 66 are calculated or determined by the control device 66 to be higher than a predetermined level, the control device will electronically signal the reducing agent supply 86 for an increased supply of reducing agent RA to the distribution device 80 to increase production of dry or moistened powder reducing agent MR for use in hopper section 47 of the multi-function duct 26. Also, the operation speed of the motor 94 and mixer 96 may be electronically increased by control device 66. If the sulfur dioxide $SO_2$ measurements transmitted to the control device 66 are calculated or determined by the control device 66 to be equal to or within a range approximately equal to a predetermined level, the control device will not electronically signal the reducing agent supply 86 to affect the supply of reducing agent RA to the distribution device 80 for production of dry or moistened powder reducing agent MR for use in hopper section 47 of the multi-function duct 26. In such case, the operation speed of the motor 94 and mixer 96 may not be affected by control device 66. If the sulfur dioxide $SO_2$ measurements transmitted to the control device 66 are calculated or determined by the control device 66 to be lower than a predetermined level, the control device will electronically signal the reducing agent supply 86 for a decreased supply of reducing agent RA to the distribution device 80 to decrease production of dry or moistened powder reducing agent MR for use in the hopper section 47 of the multi-function duct 26. Also, the operation speed of the motor 94 and mixer 96 may be electronically decreased by control device 66. Such is likewise true for the temperature sensor 104 measurements. If the temperature measurements transmitted to the control device 66 are calculated or determined by the control device 66 to be higher than a predetermined temperature level, the control device will electronically signal the water supply 82 for an increased supply of water W to the distribution device 80 for a higher water content in the dry or moistened powder reducing agent MR for use in the hopper section 47 of the multi-function duct 26. Likewise, for temperature control, the control device may also electronically signal an increased amount of the higher water content dry or moistened powder reducing agent MR to be supplied for use in the hopper section 47. If the temperature measurements transmitted to the control device 66 are calculated or determined by the control device 66 to be equal to or within a range approximately equal to a predetermined temperature level, the control device will not electronically signal the water supply 82 to affect the supply of water W to the distribution device 80 for consistent water content in the dry or moistened powder reducing agent MR for use in the hopper section 47 of the multi-function duct 26. If the temperature measurements transmitted to the control device 66 are calculated or determined by the control device 66 to be lower than a predetermined temperature level, the control device will electronically signal the water supply 82 for a decreased supply of water W to the distribution device 80 for a lower water content in the dry or moistened powder reducing agent MR for use in the hopper section 47 of the multi-function duct 26. Such is similarly true for the pressure sensor 32A and 40A measurements. If the pressure measurements transmitted to the control device 66 are calculated or determined by the control device 66 to be higher than a predetermined pressure level, the control device may electronically signal the combustion unit 12, and fuel supply 16 and gas supply 14, to decrease combustion and flue gas FG generation, or the control device may electronically signal one or more additional parallel DFGD NID systems 20 equipped with the subject multi-function ducts 26 such as that illustrated, to be brought "on-line" for operation. If the pressure measurements transmitted to the control device 66 are calculated or determined by the control device 66 to be equal to or within a range approximately equal to a predetermined pressure level, the control device will not electronically signal the combustion unit 12, and fuel supply 16 and gas supply 14, to affect combustion and flue gas FG generation. If the pressure measurements transmitted to the control device 66 are calculated or determined by the control device 66 to be lower than a predetermined pressure level, the control device may electronically signal a pressure warning and possibly terminate DFGD NID system 20 operation, and/or the control device may electronically signal one or more additional parallel DFGD NID systems 20 equipped with the subject multi-function ducts 26 such as that illustrated, for reduced operation or to be taken "off-line" from operation. Further, as described above, pressure measurements from the pressure sensors 32A and 40A are likewise used by the control device 66 to affect reducing agent supply 86 for a controlled supply of reducing agent RA to the distribution device 80 for production of dry or moistened powder reducing agent MR for use in hopper section 47 of the multi-function duct 26 for efficient flue gas FG desulfurization and reducing agent RA use.

Figure 4:
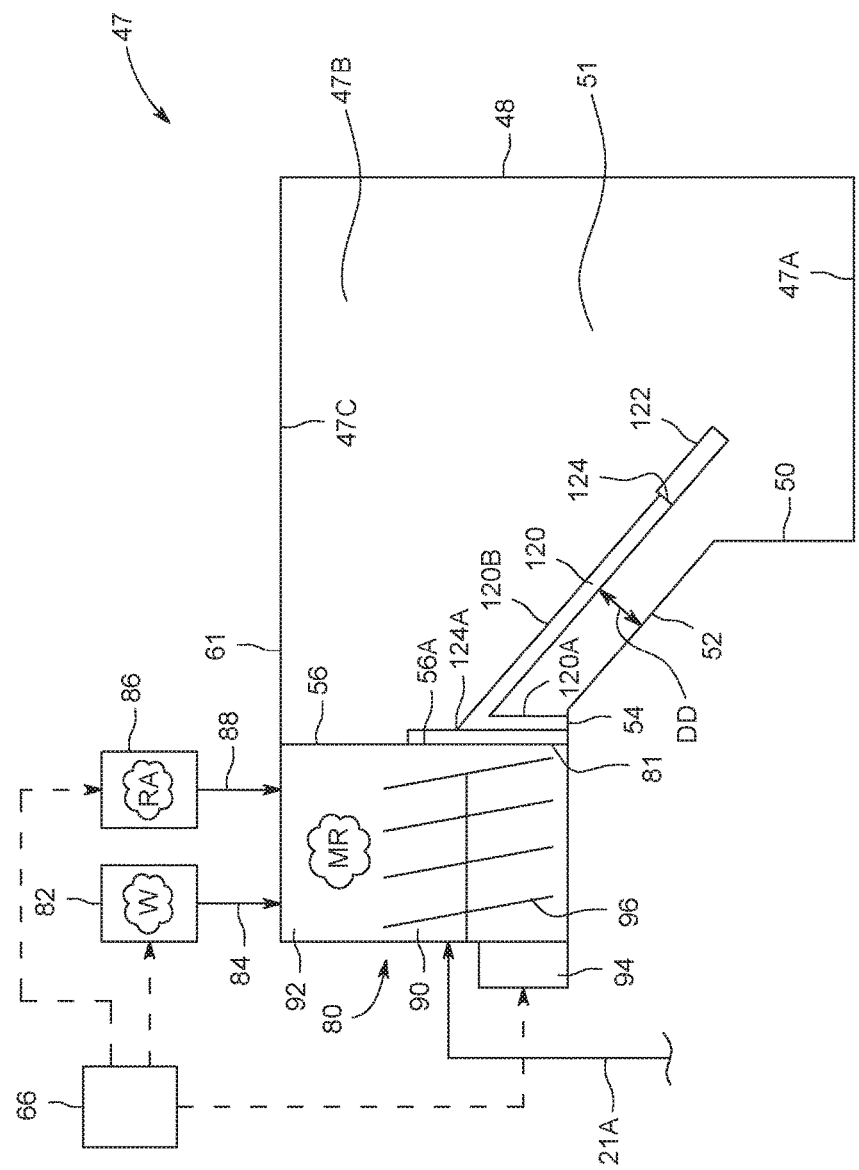
FIG. 4 is an enlarged schematic side cross-section view of the hopper section of FIG. 3 equipped with a distribution device, and equipped with a disperser plate platform.
Figure 5:
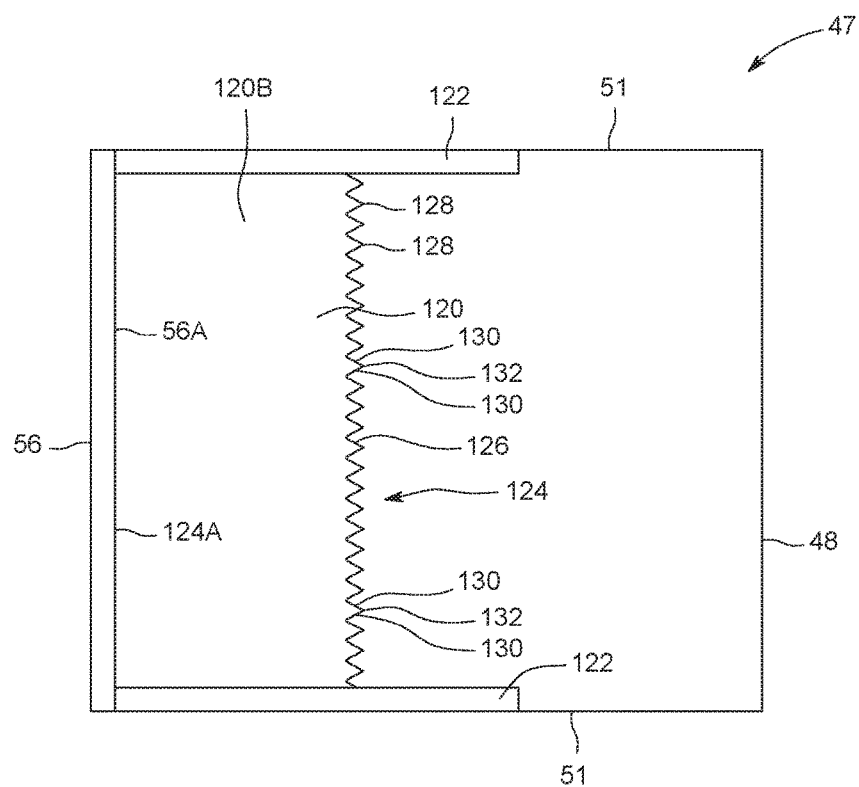
FIG. 5 is an enlarged schematic top view of the hopper section of FIG. 2 equipped with a first embodiment of the disperser plate platform of FIG. 4.

Illustrated in FIGS. 4 and 5 is another exemplified embodiment of the subject multi-function duct 26 wherein the hopper section 47 is equipped with a planar disperser plate platform 120. An attached edge 124A of disperser plate platform 120 is integrally formed with or attached to and supported by a platform support 120A abutting open inlet 56A. As such, disperser plate platform 120 is arranged a distance DD above outward wall 52 in hopper section 47. Depending on the operational design of multi-function duct 26, disperser plate platform 120 arranged a distance DD above outward wall 52, may terminate with free edge 124 above outward wall 52 just prior to the junction of outward wall 52 and second vertical wall 50, may terminate with free edge 124 just above the junction of outward wall 52 and second vertical wall 50, or may terminate with free edge 124 extended beyond the junction of outward wall 52 and second vertical wall 50 within hopper section 47. Disperser plate platform 120 is arranged at an angle of about 30 to about 60 degrees, or about 45 degrees, with respect to the second vertical wall 50 for a downward slope from open inlet 56A toward first vertical wall 48. Disperser plate platform 120 is fixed to and supported by two opposed side supports 122 removably fixed to opposed side walls 51. As such, disperser plate platform 120 may be installed with side supports 122 within hopper section 47 during original fabrication thereof, or alternatively, installed as a "retrofit" in hopper sections 47 already in operation. Best illustrated in FIG. 5, free edge 124 of disperser plate platform 120 is serrated comprising a series 126 of relatively triangular peaks 128 with opposed sides 130 terminating in points 132.

In summary, the disperser plate platform 120 comprises a platform support 120A arranged abutting an open inlet 56A of a hopper section 47 of a dry flue gas desulfurization system 20, with the disperser plate platform 120 extending from the platform support 120A a distance DD above an outward wall 52 of the hopper section 47 and toward a first vertical wall 48 of the hopper section 47, and side supports 122 removably fixed to opposed side walls 51 of the hopper section 47 with the disperser plate platform 120 removably fixed to the side supports 122 for support of the disperser plate platform 120 above the outward wall 52 of the hopper section 47. The disperser plate platform 120 comprises a serrated free edge 124. The disperser plate platform 120 is arranged in the hopper section 47 with a downward slope extending from the platform support 120A to the free edge 124. The serrated free edge 124 of the disperser plate platform 120 comprises a series of peaks 128 with opposed sides 130 terminating in points 132. Further, the platform support 120A supporting the disperser plate platform 120 above the outer wall 52 obscures a portion of the open inlet 56A.

A method of using the disperser plate platform 120 comprises arranging a platform support 120A to abut an open inlet 56A of a hopper section 47 of a dry flue gas desulfurization system 20, removably fixing side supports 122 to opposed side walls 51 of the hopper section 47 with the disperser plate platform 120 extending from the platform support 120A a distance DD above an outward wall 52 of the hopper section 47 and toward a first vertical wall 48 of the hopper section 47 removably fixed to the side supports 122, and supplying dry or moistened powder reducing agent MR through the open inlet 56A to the top surface 120B of the disperser plate platform 120 for dry or moistened powder reducing agent MR contact with flue gas FG and dry or moistened powder reducing agent MR entrainment within the flue gas FG flowing through the hopper section 47. As such, dry or moistened powder reducing agent MR contact with the flue gas FG occurs at a free edge 124 of the disperser plate platform 120. Further, the disperser plate platform 120 is arranged in the hopper section 47 with a downward slope extending from the platform support 120A to a free edge 124 for downward flow of the dry or moistened powder reducing agent MR toward a free edge 124 of the disperser plate platform 120. This downward flow of the dry or moistened powder reducing agent MR flows toward a serrated free edge 124 of the disperser plate platform 120. The serrated free edge 124 comprises a series of peaks 128 with opposed sides 130 terminating in points 132 with the opposed sides 130 creating vortices in the flue gas FG flowing past the opposed sides 130.

A method of fabricating a dry flue gas desulfurization system 20 with a disperser plate platform 120 comprises fixing a platform support 120A to abut an open inlet 56A of a hopper section 47 of the dry flue gas desulfurization system 20, removably fixing side supports 122 to opposed side walls 51 of the hopper section 47, and removably fixing a disperser plate platform 120 extending from the platform support 120A a distance DD above an outward wall 52 of the hopper section 47 and toward a first vertical wall 48 of the hopper section 47 to the side supports 122 for support of the disperser plate platform 120 above the outward wall 52 of the hopper section 47. As such, a free edge 124 of the fixed disperser plate platform 120 is serrated. The fixed disperser plate platform 120 slopes downwardly from the platform support 120A to the free edge 124. The serrated free edge 124 of the fixed disperser plate platform 120 comprises a series of peaks 128 with opposed sides 130 terminating in points 132. Further, the platform support 120A obscures a portion of the open inlet 56A.

A method of retrofitting a dry flue gas desulfurization system 20 with a disperser plate platform 120 during a period of non-use of the dry flue gas desulfurization system 20 comprises fixing a platform support 120A to abut an open inlet 56A of a hopper section 47 of the dry flue gas desulfurization system 20, removably fixing side supports 122 to opposed side walls 51 of the hopper section 47, and removably fixing a disperser plate platform 120 extending from the platform support 120A a distance DD above an outward wall 52 of the hopper section 47 and toward a first vertical wall 48 of the hopper section 47 to the side supports 122 for support of the disperser plate platform 120 above the outward wall 52 of the hopper section 47. As such, a free edge 124 of the fixed disperser plate platform 120 is serrated. The fixed disperser plate platform 120 slopes downwardly from the platform support 120A to the free edge 124. The serrated free edge 124 of the fixed disperser plate platform 120 comprises a series of peaks 128 with opposed sides 130 terminating in points 132. Further, the platform support 120A obscures a portion of the open inlet 56A.

Use of the disperser plate platform 120 provides many benefits. The series of peaks 128 act as vortex mixers, which create two counter-rotating vortices of flue gas FG from the opposed sides 130 of each peak 128. These counter-rotating vortices increases turbulence within the flue gas FG flow and hence increases flue gas FG and dry or moistened powder reducing agent MR mixing within hopper section 47 and vertical duct section 58. This enhanced flue gas FG flow turbulence and flue gas FG and dry or moistened powder reducing agent MR mixing increases operational stability within dry flue gas desulfurization system 20, which allows for improved dry flue gas desulfurization system 20 operation "turn down" capabilities, if needed, from about 100 percent operational flue gas FG flow to about 40 percent operational flue gas flow.

Figure 6:
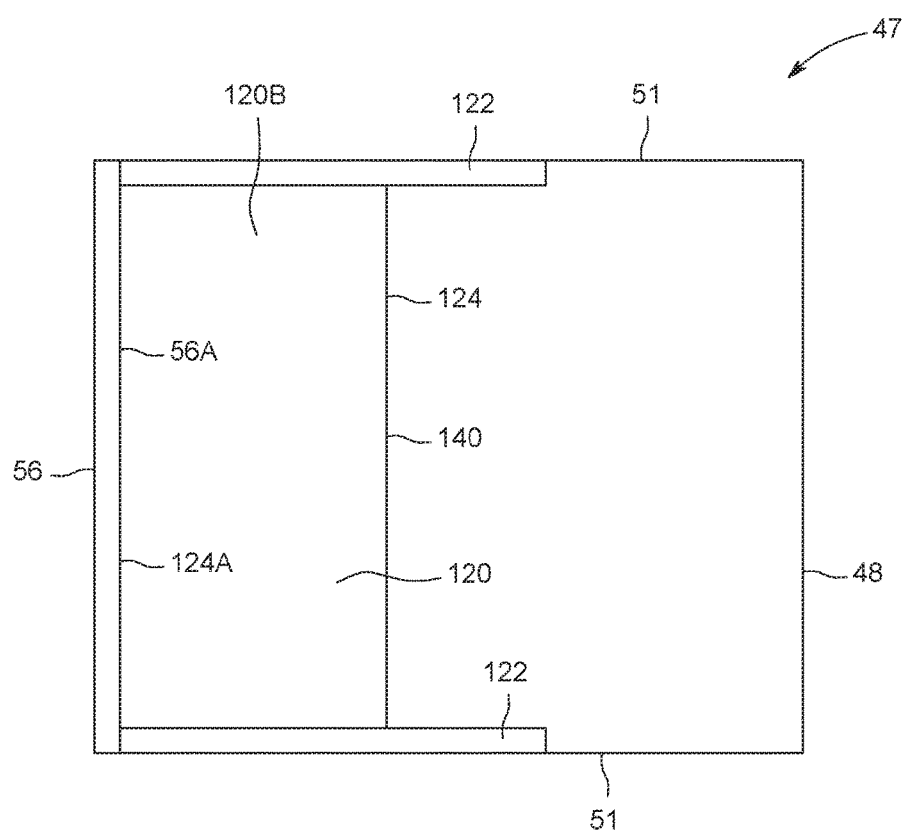
FIG. 6 is an enlarged schematic top view of the hopper section of FIG. 2 equipped with a second embodiment of the disperser plate platform of FIG. 4.

Illustrated in FIG. 6 is another exemplified embodiment of the subject multi-function duct 26 wherein the hopper section 47 is equipped with a planar disperser plate platform 120. An attached edge 124A of disperser plate platform 120 is integrally formed with or attached to and supported by a platform support 120A abutting open inlet 56A. As such, disperser plate platform 120 is arranged a distance DD above outward wall 52 in hopper section 47. Depending on the operational design of multi-function duct 26, disperser plate platform 120 arranged a distance DD above outward wall 52, may terminate with free edge 124 above outward wall 52 just prior to the junction of outward wall 52 and second vertical wall 50, may terminate with free edge 124 just above the junction of outward wall 52 and second vertical wall 50, or may terminate with free edge 124 extended beyond the junction of outward wall 52 and second vertical wall 50 within hopper section 47. Disperser plate platform 120 is arranged at an angle of about 30 to about 60 degrees, or about 45 degrees, with respect to the second vertical wall 50 for a downward slope from open inlet 56A toward first vertical wall 48. Disperser plate platform 120 is fixed to and supported by two opposed side supports 122 removably fixed to opposed side walls 51. As such, disperser plate platform 120 may be installed with side supports 122 within hopper section 47 during original fabrication thereof, or alternatively, installed as a "retrofit" in hopper sections 47 already in operation. A free edge 124 of disperser plate platform 120 comprises a relatively straight edge 140.

In summary, the disperser plate platform 120 comprises a platform support 120A arranged abutting an open inlet 56A of a hopper section 47 of a dry flue gas desulfurization system 20, with the disperser plate platform 120 extending from the platform support 120A a distance DD above an outward wall 52 of the hopper section 47 and toward a first vertical wall 48 of the hopper section 47, and side supports 122 removably fixed to opposed side walls 51 of the hopper section 47 with the disperser plate platform 120 removably fixed to the side supports 122 for support of the disperser plate platform 120 above the outward wall 52 of the hopper section 47. The disperser plate platform 120 comprises a straight free edge 124. The disperser plate platform 120 is arranged in the hopper section 47 with a downward slope extending from the platform support 120A to the free edge 124. Further, the platform support 120A supporting the disperser plate platform 120 above the outer wall 52 obscures a portion of the open inlet 56A.

A method of using the disperser plate platform 120 comprises arranging a platform support 120A to abut an open inlet 56A of a hopper section 47 of a dry flue gas desulfurization system 20, removably fixing side supports 122 to opposed side walls 51 of the hopper section 47 with the disperser plate platform 120 extending from the platform support 120A a distance DD above an outward wall 52 of the hopper section 47 and toward a first vertical wall 48 of the hopper section 47 removably fixed to the side supports 122, and supplying dry or moistened powder reducing agent MR through the open inlet 56A to the top surface 120B of the disperser plate platform 120 for dry or moistened powder reducing agent MR contact with flue gas FG and dry or moistened powder reducing agent MR entrainment within the flue gas FG flowing through the hopper section 47. As such, dry or moistened powder reducing agent MR contact with the flue gas FG occurs at a free edge 124 of the disperser plate platform 120. Further, the disperser plate platform 120 is arranged in the hopper section 47 with a downward slope extending from the platform support 120A to a free edge 124 for downward flow of the dry or moistened powder reducing agent MR toward a free edge 124 of the disperser plate platform 120. This downward flow of the dry or moistened powder reducing agent MR flows toward a serrated free edge 124 of the disperser plate platform 120.

A method of fabricating a dry flue gas desulfurization system 20 with a disperser plate platform 120 comprises fixing a platform support 120A to abut an open inlet 56A of a hopper section 47 of the dry flue gas desulfurization system 20, removably fixing side supports 122 to opposed side walls 51 of the hopper section 47, and removably fixing a disperser plate platform 120 extending from the platform support 120A a distance DD above an outward wall 52 of the hopper section 47 and toward a first vertical wall 48 of the hopper section 47 to the side supports 122 for support of the disperser plate platform 120 above the outward wall 52 of the hopper section 47. As such, a free edge 124 of the fixed disperser plate platform 120 is straight. The fixed disperser plate platform 120 slopes downwardly from the platform support 120A to the free edge 124. Further, the platform support 120A obscures a portion of the open inlet 56A.

A method of retrofitting a dry flue gas desulfurization system 20 with a disperser plate platform 120 during a period of non-use of the dry flue gas desulfurization system 20 comprises fixing a platform support 120A to abut an open inlet 56A of a hopper section 47 of the dry flue gas desulfurization system 20, removably fixing side supports 122 to opposed side walls 51 of the hopper section 47, and removably fixing a disperser plate platform 120 extending from the platform support 120A a distance DD above an outward wall 52 of the hopper section 47 and toward a first vertical wall 48 of the hopper section 47 to the side supports 122 for support of the disperser plate platform 120 above the outward wall 52 of the hopper section 47. As such, a free edge 124 of the fixed disperser plate platform 120 is straight. The fixed disperser plate platform 120 slopes downwardly from the platform support 120A to the free edge 124. Further, the platform support 120A obscures a portion of the open inlet 56A.

Use of the disperser plate platform 120 provides many benefits. The straight free edge 124 increases turbulence within the flue gas FG flow and hence increases flue gas FG and dry or moistened powder reducing agent MR mixing within hopper section 47 and vertical duct section 58. Benefits of the subject multi-function duct 26 include elimination of venturi flow of flue gas FG through the subject multi-function duct 26. With the elimination of venturi flow of the flue gas FG, the subject multi-function duct 26 enables significant plant 10 pressure management. A relatively low pressure measurement is measured by pressure sensor 32A arranged in the horizontal inlet section 28. Likewise, a relatively high pressure measurement is measured by pressure sensor 40A arranged in the bend section 36. The combination of the relatively low pressure measurement and the relatively high pressure measurement increases the magnitude of the differential pressure signal transmitted to and received by the control device 66 for improved plant 10 pressure management. Further, the hopper section 47 of the subject multi-function duct 26 may be enlarged according to plant 10 requirements adding beneficial design flexibility. Still further, construction of the subject multi-function duct 26 is simplified over that of the venture flow "J" duct disclosed in WO 97/37747, and allows for significant material savings thereover.

A method of using the subject multi-function duct 26 comprises fluidly connecting to a source 12 of flue gas FG the multi-function duct 26 comprising a horizontal inlet section 28, a bend section 36, an offset section 44, a hopper section 47, and a vertical duct section 58. The subject method includes fabricating various sections of the multi-function duct 26 from metal sheet material using welding, rivets, or the like, or combinations thereof for material connections where necessary. As such, the horizontal inlet section 28 comprises an inlet opening 30 fluidly connected to an interior area 30A defined by two opposed side walls 31 arranged between an opposed top wall 32 and bottom wall 34. Opposite inlet opening 30 is outlet opening 33. This horizontal inlet section 28 provides relatively unrestricted flue gas FG flow therethrough. Within the horizontal inlet section 28 is a pressure sensor 32A for measuring the pressure of the flue gas FG flowing through the horizontal inlet section 28.

Fluidly connected to the horizontal inlet section 28, is a bend section 36 of restricted flue gas FG flow. The bend section 36 comprises an inlet opening 37 fluidly connected to an interior area 37A. Interior area 37A is defined by an extension wall 35, a deflect wall 38, a vertical wall 38A, a bend wall 40, and two opposed side walls 41. The deflect wall 38 is arranged at an angle $\alpha$ of about 30 degrees to about 60 degrees, or about 45 degrees with respect to the bottom wall 34 of the horizontal inlet section 28. Arranged between the extension wall 35 and the deflect wall 38 is a closable opening 35A for removal of solid material collected between the walls 35, 38. The deflect wall 38 joins the vertical wall 38A arranged at an angle of about 70 to about 110 degrees, or about 90 degrees with respect to the bottom wall 34 of the horizontal inlet section 28. Opposed to the deflect wall 38 and the vertical wall 38A is the bend wall 40. Bend wall 40 is curved having a radius of curvature of about 60 to about 120 degrees, or about 90 degrees. Opposed side walls 41 are arranged between the joined deflect wall 38 and vertical wall 38A, and the bend wall 40. The cross sectional area of an outlet opening 43 of the bend section 36 is about 50 percent to about 75 percent smaller than that of the outlet opening 33 of the horizontal inlet section 28. Due to the smaller cross sectional area of the outlet opening 43 of the bend section 36, flue gas FG flow is restricted causing a flue gas FG pressure increase and flow velocity increase therein and a pressure drop downstream thereof. Within the bend section 36 is a pressure sensor 40A for measuring the pressure of the flue gas FG flowing through the bend section 36. As such, a flue gas FG pressure measurement is measured in the unrestricted horizontal inlet section 28 and a flue gas FG pressure measurement is measured in the restricted bend section 36. Each of the flue gas pressure measurements are electronically received by a control device 66. The control device 66 calculates or determines from the pressure measurements received the multi-function duct 26 pressure differential. This multi-function duct 26 pressure differential is used to measure flue gas FG flow. Based on the flue gas FG flow as calculated or determined from the multi-function duct 26 pressure differential, the control device 66 electronically controls a supply of an amount of a dry or moistened powder reducing agent MR to the multi-function duct 26 for effective flue gas FG desulfurization.

Fluidly connected to the bend section 36 is an offset section 44. Offset section 44 includes an inlet opening 45 fluidly connected to an interior area 45 defined by an inward wall 46 joined to the vertical wall 38A of the bend section 36, an opposed outward wall 46A joined to the bend wall 40 and opposed side walls 49 arranged between the inward wall 46 and outward wall 46A. The inward wall 46 is offset from vertical wall 38A by an angle $\beta$ of about 5 to about 30 degrees, or about 15 degrees. The outward wall 46A extends outwardly at an angle of about 30 to about 60 degrees, or about 45 degrees from a vertical end portion 42 of the bend wall 40. This junction point 42A of the outward wall 46A and the vertical end portion 42 of the bend wall 40 is a relatively sharp and abrupt angle to prevent a recirculation of the flow of flue gas FG back to the offset section 44. As such, the relatively sharp and abrupt angle of this junction point 42A promotes continued upward flue gas FG flow. Further, this configuration of the offset section 44 works in conjunction with the below described hopper section 47 to provide improved dry or moistened powder reducing agent MR flow and efficiency. Opposite inlet opening 45 of offset section 44 is outlet opening 45B. Fluidly connected to offset section 44 is a hopper section 47. Hopper section 47 includes an inlet opening 47A fluidly connected to an interior area 47B defined by a first vertical wall 48 joined to the inward wall 46 of the offset section 44, a second vertical wall 50 joined to the outward wall 46A of the offset section 44. Joined to the second vertical wall 50 of the hopper section 47 is an outward wall 52 arranged at about a 45 degree angle with respect to the second vertical wall 50. Joined to the outward wall 52 is a horizontal wall 54. Joined to the horizontal wall 54 is a third vertical wall 56 arranged parallel with respect to the opposed first vertical wall 48. Two opposed side walls 51 are arranged between the first vertical wall 48, and the opposed second vertical wall 50, outward wall 52, horizontal wall 54 and third vertical wall 56. Within the third vertical wall 56 of the hopper section 47 is an open inlet 56A. Through the open inlet 56A, dry or moistened powder reducing agent MR is introduced into the hopper section 47 of the multi-function duct 26 for intermixing contact with flue gas FG flowing therethrough, out outlet opening 47C. A portion of introduced dry or moistened powder reducing agent MR may impact the first vertical wall 48 and slide or flow downwardly along the first vertical wall 48. Dry or moistened powder reducing agent MR sliding or flowing downwardly along the first vertical wall 48 is "picked up" or entrained within the upward flow of flue gas FG diverted inwardly by the inward wall 46 of the offset section 44. As such, the offset section 44 works in conjunction with the hopper section 47 to provide improved dry or moistened powder reducing agent MR flow and efficiency.

In fluid communication with open inlet 56A of hopper section 47 is an outlet 81 of a distribution device 80, as illustrated in FIG. 3. An exemplified distribution device 80 is disclosed in U.S. Pat. No. 5,887,973, incorporated herein in its entirety by reference. As such, distribution device 80 arranged vertically above horizontal inlet section 28 for a reduced overall system footprint, distributes a dry or moistened powder reducing agent MR, such as hydrated lime $(Ca(OH)_2)$ into flue gas FG flowing through the subject multi-function duct 26. For this purpose, water W from a water supply 82 flows through a fluidly connected pipe 84 to fluidly connected distribution device 80. Further, reducing agent RA from a reducing agent supply 86 is supplied through a fluidly connected duct 88 to fluidly connected distribution device 80. Distribution device 80 comprises a container 90 essentially in the shape of an elongated box defining an open interior area 92. Container 90 comprises a motor 94 and a mixer 96 for mixing together water W from water supply 82, optionally a portion of separated solid materials SM collected in hoppers 21 via ducts 21A, optionally a portion of solid material removed from closable opening 35A via duct 35B, and reducing agent RA from the reducing agent supply 86, to produce dry or moistened powder reducing agent MR having a water content of approximately 1 percent to approximately 6 percent, or approximately 3 percent. Operation speed of motor 94 and mixer 96 are electronically controlled by control device 66.

Dry or moistened powder reducing agent MR is uniformly distributed by the distribution device 80 through the fluidly connected open inlet 56A of hopper section 47 of the subject multi-function duct 26. As such, dry or moistened powder reducing agent MR may be continuously introduced into hopper section 47 for uniform distribution and intermixing contact with the flue gas FG flowing therethrough.

Fluidly connected to hopper section 47 is a vertical duct section 58. Vertical duct section 58 comprises an inlet opening 62 fluidly connected to an interior area 62A defined by four vertical walls 60 joined to the four vertical walls 48, 51, 56 of the hopper section 47. However, as an option, the vertical wall 60 of the vertical duct section 58 directly above the third vertical wall 56 may be arranged a relatively small distance D inward of and parallel to the third vertical wall 56 in order to create a horizontal lip 61 therebetween. Within the vertical duct section 58, intermixing contact of the introduced dry or moistened powder reducing agent MR with the flue gas FG continues. The dry or moistened powder reducing agent MR reacts with acid gas in the flue gas FG thereby reducing or removing acid gas from the flue gas FG and producing a cleaned flue gas CG. The reaction between the acid gas in the flue gas FG and the dry or moistened powder reducing agent MR, produces a dry reaction product DR entrained by the flue gas FG. The entrained dry reaction product DR flows with the flue gas FG from vertical duct section 58 via outlet 62B through a fluidly connected duct 20A, and into a particulate collector 22, such as a fabric filter, an electrostatic precipitator or the like. Solid particulates carried in the flue gas FG including the entrained dry reaction product DR is separated from the flow of flue gas FG and collected in hoppers 21 of particulate collector 22 as separated solid materials SM. The separated solid materials SM collected in hoppers 21 are optionally transported through fluidly connected ducts 21A to fluidly connected container 90 for mixture with water W from water supply 82, and reducing agent RA from the reducing agent supply 86, to produce the dry or moistened powder reducing agent MR. Alternatively, a portion of the separated solid materials SM collected in hoppers 21 may be transported elsewhere for other purposes or discarded in an environmentally conservative manner via duct 21B, which is likewise true for solid material removed from closable opening 35A via duct 35B. Cleaned flue gas CG exits particulate collector 22 via fluidly connected duct 22A for release to the atmosphere via fluidly connected stack 24.

According to the subject method, control of the subject DFGD NID system 20, sulfur dioxide $SO_2$ sensors 102, temperature sensors 104 and pressure sensors 32A, 40A, measure sulfur dioxide levels, measure temperatures, and measure pressures, respectively, electronically transmitting the measured sulfur dioxide levels, temperatures and pressures to the control device 66. For such purpose, sulfur dioxide $SO_2$ sensors 102 are preferably arranged upstream of the DFGD NID system 20 in duct 18A and downstream of particulate collector 22 in duct 22A, although other arrangements are likewise possible. Temperature sensors 104 are also preferably arranged upstream of the DFGD NID system 20 in duct 18A and downstream of particulate collector 22 in duct 22A, although other arrangements are likewise possible. Pressure sensors 32A and 40A are arranged in multi-function duct 26 as described above. Measurements by the sulfur dioxide $SO_2$ sensors 102, temperature sensors 104 and pressure sensors 32A and 40A are electronically transmitted to control device 66 for control of DFGD NID system 20. For example, if the sulfur dioxide $SO_2$ measurements transmitted to the control device 66 are calculated or determined by the control device 66 to be higher than a predetermined level, the control device will electronically signal the reducing agent supply 86 for an increased supply of reducing agent RA to the distribution device 80 to increase production of dry or moistened powder reducing agent MR for use in hopper section 47 of the multi-function duct 26. Also, the operation speed of the motor 94 and mixer 96 may be electronically increased by control device 66. If the sulfur dioxide $SO_2$ measurements transmitted to the control device 66 are calculated or determined by the control device 66 to be equal to or within a range approximately equal to a predetermined level, the control device will not electronically signal the reducing agent supply 86 to affect the supply of reducing agent RA to the distribution device 80 for consistent production of dry or moistened powder reducing agent MR for use in hopper section 47 of the multi-function duct 26. In such case, the operation speed of the motor 94 and mixer 96 may not be electronically affected by control device 66. If the sulfur dioxide $SO_2$ measurements transmitted to the control device 66 are calculated or determined by the control device 66 to be lower than a predetermined level, the control device will electronically signal the reducing agent supply 86 for a decreased supply of reducing agent RA to the distribution device 80 for decreased production of dry or moistened powder reducing agent MR for use in the hopper section 47 of the multi-function duct 26. Also, the operation speed of the motor 94 and mixer 96 may be electronically decreased by control device 66. Such is likewise true for the temperature sensor 104 measurements. If the temperature measurements transmitted to the control device 66 are calculated or determined by the control device 66 to be higher than a predetermined temperature level, the control device will electronically signal the water supply 82 for an increased supply of water W to the distribution device 80 to produce increased water content dry or moistened powder reducing agent MR for use in the hopper section 47 of the multi-function duct 26. Likewise, for temperature control, the control device may also electronically signal an increased amount of the higher water content dry or moistened powder reducing agent MR to be supplied for use in the hopper section 47. If the temperature measurements transmitted to the control device 66 are calculated or determined by the control device 66 to be equal to or within a range approximately equal to a predetermined temperature level, the control device will not electronically signal the water supply 82 to affect the supply of water W to the distribution device 80 for consistent water content in the dry or moistened powder reducing agent MR for use in the hopper section 47 of the multi-function duct 26. If the temperature measurements transmitted to the control device 66 are calculated or determined by the control device 66 to be lower than a predetermined temperature level, the control device will electronically signal the water supply 82 for a decreased supply of water W to the distribution device 80 to decrease the water content of the dry or moistened powder reducing agent MR for use in the hopper section 47 of the multi-function duct 26. Such is similarly true for the pressure sensor 32A and 40A measurements. If the pressure measurements transmitted to the control device 66 are calculated or determined by the control device 66 to be higher than a predetermined pressure level, the control device may electronically signal the combustion unit 12, and fuel supply 16 and gas supply 14, to decrease combustion and flue gas FG generation, or the control device may electronically signal one or more additional parallel DFGD NID systems 20 equipped with the subject multi-function ducts 26 such as that illustrated, to be brought "on-line" for operation. If the pressure measurements transmitted to the control device 66 are calculated or determined by the control device 66 to be equal to or within a range approximately equal to a predetermined pressure level, the control device will not electronically signal the combustion unit 12, and fuel supply 16 and gas supply 14, to affect combustion and flue gas FG generation. If the pressure measurements transmitted to the control device 66 are calculated or determined by the control device 66 to be lower than a predetermined pressure level, the control device may electronically signal a pressure warning and possibly terminate DFGD NID system 20 operation, and/or the control device may electronically signal one or more additional parallel DFGD NID systems 20 equipped with the subject multi-function ducts 26 such as that illustrated, for reduced operation or to be taken "off-line" from operation. Further, as described above, pressure measurements from the pressure sensors 32A and 40A are likewise used by the control device 66 to affect reducing agent supply 86 for a controlled supply of reducing agent RA to the distribution device 80 for production of dry or moistened powder reducing agent MR for use in hopper section 47 of the multi-function duct 26 for efficient flue gas FG desulfurization and reducing agent RA use. Benefits of the subject method of using the multi-function duct 26 include elimination of venturi flow of flue gas FG through the subject multi-function duct 26. With the elimination of venturi flow of the flue gas FG, the subject multi-function duct 26 enables significant plant 10 pressure management. A relatively low pressure measurement is measured by pressure sensor 32A arranged in the horizontal inlet section 28. Likewise, a relatively high pressure measurement is measured by pressure sensor 40A arranged in the bend section 36. The combination of the relatively low pressure measurement and the relatively high pressure measurement increases the magnitude of the differential pressure signal received by the control device 66 for improved plant 10 pressure management. Further, according to the subject method, the hopper section 36 of the subject multi-function duct 26 may be enlarged according to plant 10 requirements adding beneficial design flexibility. Still further, according to the subject method, construction of the subject multi-function duct 26 is simplified over that of the venturi flow "J" duct disclosed in WO 97/37747, and allows for significant material savings thereover.

In summary, the subject multi-function duct 26 useful for flue gas desulfurization comprises a horizontal inlet section 28 equipped with a first pressure sensor 32A, a bend section 36 equipped with a second pressure sensor 40A, an offset section 44, a hopper section 47 equipped with a distribution device 80, and a vertical duct section 58. In the subject multi-function duct 26, the first pressure sensor 32A and the second pressure sensor 40A are each operative to electronically transmit pressure measurements to a control device 66. Further, the distribution device 80 associated with the multi-function duct 26 is operative to distribute a dry or moistened reducing agent MR within the hopper section 47 upon flue gas FG flow through the hopper section 47. Still further, in the subject multi-function duct 26, an outlet opening 43 of the bend section 36 is 50 to 75 percent smaller in cross section than that of an outlet opening 33 of the horizontal inlet section 28. The subject disclosure likewise provides for a plant 10 comprising a source 12 of flue gas FG, a desulfurization system 20 for treatment of the flue gas FG comprising a multi-function duct 26 comprising a horizontal inlet section 28 equipped with a first pressure sensor 32A, a bend section 36 equipped with a second pressure sensor 40A, an offset section 44, a hopper section 47 equipped with a distribution device 80, and a vertical duct section 58, and a particulate collector 22. In the subject plant 10, the first pressure sensor 32A and the second pressure sensor 40A are each operative to electronically transmit pressure measurements to a control device 66. Further, in the subject plant 10, the distribution device 80 is operative to distribute a reducing agent MR within the hopper section 47 upon flue gas FG flow through the hopper section 47 for reaction between the reducing agent MR and acid gas within the flue gas FG to produce a dry reaction product DR. Still further, within the subject plant 10, an outlet opening 43 of the bend section 36 is 50 to 75 percent smaller in cross section than that of an outlet opening 33 of the horizontal inlet section 28.

In summary, a method of using a multi-function duct 26 useful for flue gas desulfurization comprises fluidly connecting a source 12 of flue gas FG to a multi-function duct 26 comprising a horizontal inlet section 28 equipped with a first pressure sensor 32A, a bend section 36 equipped with a second pressure sensor 40A, an offset section 44, a hopper section 47 equipped with a distribution device 80, and a vertical duct section 58, and distributing a reducing agent MR into flue gas FG flowing through the hopper section 47 via the distribution device 80 for contact reaction between the reducing agent MR and acid gas within the flue gas FG to produce a dry reaction product DR. According to this method the first pressure sensor 32A and the second pressure sensor 40A are each operative to electronically transmit pressure measurements to a control device 66. Also according to this method, the first pressure sensor 32A and the second pressure sensor 40A are each operative to electronically transmit pressure measurements to a control device 66 operative for control of reducing agent MR supply to the hopper section 47 based on received pressure measurements. Also in accordance with this method an outlet opening 43 of the bend section 36 is 50 to 75 percent smaller in cross section than that of an outlet opening 33 of the horizontal inlet section 28. The subject disclosure also provides for a method of operating a plant 10 comprising fluidly connecting a source 12 of flue gas FG to a multi-function duct 26 comprising a horizontal inlet section 28 equipped with a first pressure sensor 32A, a bend section 36 equipped with a second pressure sensor 40A, an offset section 44, a hopper section 47 equipped with a distribution device 80, and a vertical duct section 58, distributing a reducing agent MR into flue gas FG flowing through the hopper section 47 via the distribution device 80 for contact reaction between the reducing agent MR and acid gas within the flue gas FG to produce a dry reaction product DR, and separating the dry reaction product DR from the flue gas FG in a particulate collector 22 to produce cleaned flue gas CG. In accordance with this method, the first pressure sensor 32A and the second pressure sensor 40A are each operative to electronically transmit pressure measurements to a control device 66. Also according to this method, an outlet opening 43 of the bend section 36 is 50 to 75 percent smaller in cross section than that of an outlet opening 33 of the horizontal inlet section 28.

While this disclosure been described with reference to various exemplified embodiments, it will be understood by those skilled in the art that various changes can be made and equivalents can be substituted for features thereof without departing from the scope of the disclosure. In addition, many modifications can be made to adapt a particular situation or material to the teachings of the disclosure without departing from the essential scope thereof. Therefore, it is intended that the disclosure not be limited to the particular exemplified embodiments disclosed herein as the best mode contemplated, but that the disclosure will include all embodiments falling within the scope of the appended claims.

The invention claimed is:

1. A multi-function duct useful for flue gas desulfurization comprising:
   a horizontal inlet section equipped with a first pressure sensor;
   a bend section, including an extension wall, a deflect wall, and a closable opening therebetween, equipped with a second pressure sensor;
   an offset section;
   a hopper section equipped with a distribution device; and
   a vertical duct section.

2. The multi-function duct of claim 1, wherein the first pressure sensor and the second pressure sensor are each operative to electronically transmit pressure measurements to a control device.

3. The multi-function duct of claim 1, wherein the distribution device is operative to distribute a dry or moistened reducing agent within the hopper section upon flue gas flow through the hopper section.

4. The multi-function duct of claim 1, wherein an outlet of the bend section is 50 to 75 percent smaller in cross section than that of an outlet of the horizontal inlet section.

5. A plant comprising:
   a source of flue gas;
   a desulfurization system for treatment of the flue gas comprising a multi-function duct comprising:
      a horizontal inlet section equipped with a first pressure sensor;
      a bend section, including an extension wall, a deflect wall, and a closable opening therebetween, equipped with a second pressure sensor;
      an offset section;
      a hopper section equipped with a distribution device; and
      a vertical duct section; and
   a particulate collector.

6. The plant of claim 5, wherein the first pressure sensor and the second pressure sensor are each operative to electronically transmit pressure measurements to a control device.

7. The plant of claim 5, wherein the distribution device is operative to distribute a reducing agent within the hopper section upon flue gas flow through the hopper section for reaction between the reducing agent and acid gas within the flue gas to produce a separable reaction product.

8. The plant of claim 5, wherein an outlet of the bend section is 50 to 75 percent smaller in cross section than that of an outlet of the horizontal inlet section.

9. A method of using a multi-function duct useful for flue gas desulfurization comprising:
   fluidly connecting a source of flue gas to a multi-function duct comprising:
      a horizontal inlet section equipped with a first pressure sensor;
      a bend section, including an extension wall, a deflect wall, and a closable opening therebetween, equipped with a second pressure sensor;
      an offset section;
      a hopper section equipped with a distribution device; and
      a vertical duct section; and
   distributing a reducing agent into flue gas flowing through the hopper section via the distribution device for contact reaction between the reducing agent and acid gas within the flue gas to produce a separable reaction product.

10. The method of claim 9, wherein the first pressure sensor and the second pressure sensor are each operative to electronically transmit pressure measurements to a control device.

11. The method of claim 9, wherein the first pressure sensor and the second pressure sensor are each operative to electronically transmit pressure measurements to a control device operative for control of reducing agent supply to the hopper section based on received pressure measurements.

12. The method of claim 9, wherein an outlet of the bend section is 50 to 75 percent smaller in cross section than that of an outlet of the horizontal inlet section.

13. A method of operating a plant comprising:
   fluidly connecting a source of flue gas to a multi-function duct comprising:
      a horizontal inlet section equipped with a first pressure sensor;
      a bend section, including an extension wall, a deflect wall, and a closable opening therebetween, equipped with a second pressure sensor;
      an offset section;
      a hopper section equipped with a distribution device; and
      a vertical duct section;
   distributing a reducing agent into flue gas flowing through the hopper section via the distribution device for contact reaction between the reducing agent and acid gas within the flue gas to produce a separable reaction product; and
   separating the separable reaction product from the flue gas in a particulate collector to produce cleaned flue gas.

14. The method of claim 13, wherein the first pressure sensor and the second pressure sensor are each operative to electronically transmit pressure measurements to a control device.

15. The method of claim 13, wherein an outlet of the bend section is 50 to 75 percent smaller in cross section than that of an outlet of the horizontal inlet section.

* * * * *